L. DAILEY.
PORTABLE BORING MACHINE.
APPLICATION FILED MAR. 2, 1909.
960,002.
Patented May 31, 1910.
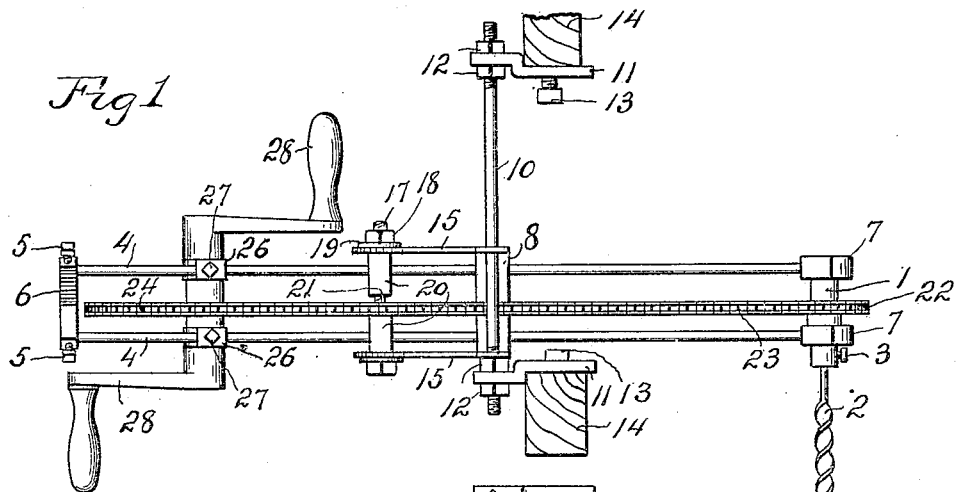
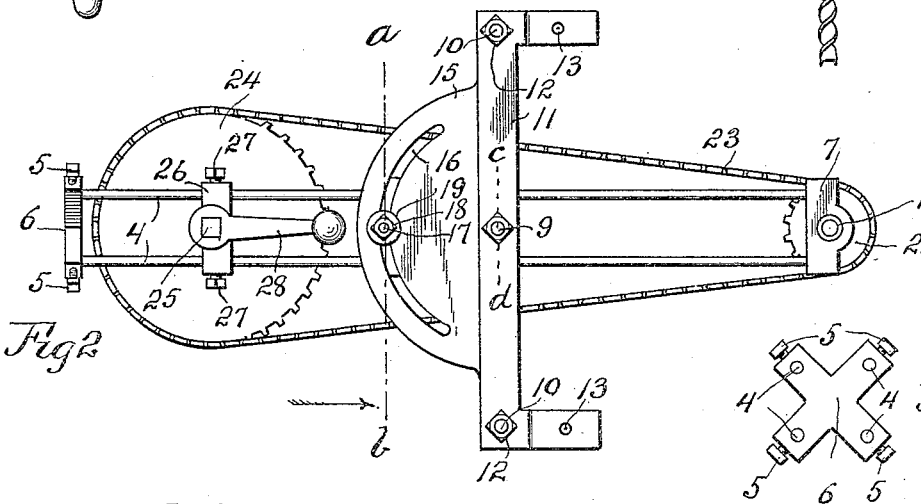
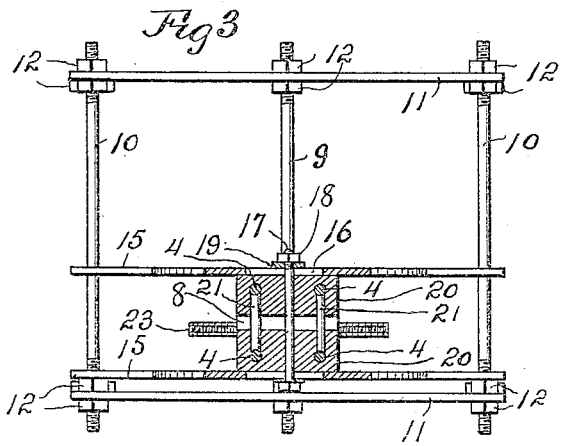
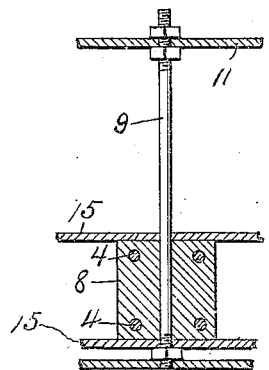
WITNESSES:
R.L. Hamilton
E.B. House
INVENTOR.
Lorenzo Dailey
BY
Warren D. House
His ATTORNEY.

UNITED STATES PATENT OFFICE.

LORENZO DAILEY, OF KANSAS CITY, KANSAS.

PORTABLE BORING-MACHINE.

960,002.  Specification of Letters Patent.  Patented May 31, 1910.

Application filed March 2, 1909. Serial No. 480,855.

*To all whom it may concern:*

Be it known that I, LORENZO DAILEY, a citizen of the United States, residing at Kansas City, in the county of Wyandotte and State of Kansas, have invented certain new and useful Improvements in Portable Boring-Machines, of which the following is a specification.

My invention relates to improvements in portable boring machines.

The object of my invention is to provide a portable boring machine by means of which holes may be readily bored in places to which access with ordinary boring tools is either impossible or difficult.

The novel features of my invention are hereinafter fully described and claimed.

In the accompanying drawings, which illustrate the preferred form of my invention:—Figure 1 is a side elevation. Fig. 2 is a plan view. Fig. 3 is a cross section on the dotted line *a—b* of Fig. 2. Fig. 4 is a cross section on the dotted line *c—d* of Fig. 2. Fig. 5 is an end elevation of the tool holder support.

Similar characters of reference denote similar parts.

My invention provides a tool holder rotatively mounted on a suitable support, which is preferably movable on a supporting means in any direction in one plane and also transversely to that plane, whereby the holder carrying the boring tool may be disposed in any desired position relative to the supporting means. The supporting means is preferably provided with anchoring means by means of which it may be securely held during a boring operation. Suitable means are provided by which rotation may be imparted to the boring instrument.

In the form of my invention shown in the drawings, 1 denotes the rotary tool holder comprising preferably a vertical tubular shaft adapted to receive the shank of a boring tool 2, which is held in position by means of a set screw 3, mounted in the tool holder 1, as shown in Fig. 1. The tool holder 1 is rotatively mounted in a suitable support, comprising preferably the following described parts:—Four horizontal rods 4, disposed parallel with each other, are located, two in one horizontal plane and two in another horizontal plane, respectively above the lower rods. The rods 4 at one set of ends are rigidly secured in any desired manner, as by set screws 5, in holes provided in a vertical plate 6. The opposite ends of the upper and lower sets of rods 4 are rigidly secured respectively in two horizontal plates 7, having vertical holes in which are rotatively mounted respectively, the upper and lower ends of the tool holder 1. The rods 4 are horizontally slidable in holes provided therefor, in a vertical block 8, which is pivotally mounted upon a vertical rod 9, which forms a portion of the supporting means. Parallel with the vertical rod 9 and at opposite sides thereof are rods 10. The upper and lower ends of the rods 9 and 10 are screw threaded and extend respectively through two horizontal plates 11 to which the said rods are rigidly secured, by means of nuts 12, mounted on said rods, above and below each of the plates 11, against which said nuts bear. The plates 11 are preferably provided with vertical, screw threaded holes in which are fitted set screws 13, which, with said plates, comprise two anchoring means by which the supporting means may be rigidly held in a desired position. The plates 11 are adapted to bear against any suitable blocking, such as timbers 14, into which the set screws 13 may be screwed. Two horizontal plates 15, disposed respectively above and below the block 8, are slidably mounted, as is also the block 8, upon the rods 9 and 10, intermediate the two plates 11. Each of said plates 15 is provided with an arcuate slot 16, concentric with the rod 9 and through which extends a vertical bolt 17, the head of which bears against the underside of the lower plate 15 and upon the upper screw threaded end of which is mounted a nut 18, which bears upon a washer 19, that rests upon the upper plate 15. The bolt 17 extends through two horizontal blocks 20, mounted slidably, one above the other, intermediate the plates 15, on the upper and lower set of rods 4, respectively. Two vertical rods 21, are mounted in holes provided therefor in the block 20, and have their upper ends adapted to bear respectively against the upper rods 4, and having their lower ends adapted to bear respectively against the lower rods 4. When the nut 18 is turned in the proper direction on the bolt 17, said bolt is caused to tightly clamp the plates 15, thereby preventing swinging movement of the rods 4 and the block 8. At the same time the rods 21 are caused to tightly bear against the rods 4, thus preventing any sliding movement lengthwise of the rods 4 in the blocks 8 and 20.

Secured on the tool holder 1 is a belt wheel, preferably a sprocket wheel 22, on which is mounted a chain belt 23, which is also mounted on a sprocket wheel 24 which is preferably adjustable toward and from the wheel 22, so as to tighten or loosen the belt 23. The sprocket wheel 24 is preferably rigidly secured on a vertical shaft 25, rotatively mounted in two horizontal blocks 26, which are slidably mounted respectively on the upper and lower rods 4. In the ends of each block 26 is a set screw 27, adapted to bear against the adjacent rod 4. By loosening the set screws 27, the blocks 26 may be moved toward and from the blocks 7, thus moving the shaft 25 and wheel 24. Preferably, two cranks 28 are secured respectively to opposite ends of the shaft 25.

In operating my invention, the plates 11 are first securely anchored in a suitable position between suitable timbers 14, the nut 18 having been previously loosened so as to permit setting of the boring tool 2 in the desired position. This latter object may be effected by laterally swinging the rods 4 and block 8 and moving the rods 4 in the blocks 8 and 20 until the boring tool 2 has been placed in the position where it is desired to bore a hole. The nut 18 is then tightened so as to secure the tool holder against horizontal movement in either direction, as already described. The tool holder is then rotated by means of the cranks 28 and the mechanism connecting the same with the tool holder. As the boring tool 2 enters the material in the cutting operation the tool may be fed forward by forcing the tool holder support lengthwise on the rods 9 and 10.

Various modifications of my invention, within the scope of the appended claims, may be made without departing from its spirit.

Having thus described my invention, what I claim and desire to secure by Letters Patent, is:—

1. In a portable boring machine, the combination with a supporting frame having a vertical rod, of a block rotative on said rod and slidable lengthwise thereof, a swinging frame supported by said block and slidable thereon at right angles to said rod, a tool holder rotative on said swinging frame and having its axis parallel with said rod, a belt wheel secured on and rotative with said tool holder, a second belt wheel rotative on said swinging frame, a belt connecting said two wheels, and means for rotating said second belt wheel.

2. In a portable boring machine, the combination with a supporting frame, of a block vertically slidable on said frame and rotative thereon on a vertical axis, a swinging frame having four horizontal rods disposed in pairs, one pair above the other, said rods being horizontally slidable in said block, a tool holder rotative in said swinging frame and having its axis parallel with the axis of said block, a belt wheel rotative with said tool holder, a second belt wheel rotative on said swinging frame, a belt connecting said two wheels, means by which the second belt wheel may be rotated, and releasable clamping means for locking the swinging frame from swinging and from horizontal sliding movement, said clamping means comprising two horizontal plates disposed respectively above and below the four horizontal rods and slidable vertically with said block on said supporting frame, said plates having each an arcuate slot disposed concentric with the axis of said block, two bearing blocks respectively slidably mounted on said two pairs of horizontal rods, two vertical rods disposed between the upper and lower pairs of horizontal rods, and a clamping bolt extending through said slots and through said bearing blocks and having means by which it may draw said two plates toward each other so as to clamp said two vertical rods between the upper and lower pairs of horizontal rods.

In testimony whereof I have signed my name to this specification in presence of two subscribing witnesses.

LORENZO DAILEY.

Witnesses:
    E. B. House,
    James Doam.